(12) United States Patent
Kobayashi et al.

(10) Patent No.: US 6,751,937 B2
(45) Date of Patent: Jun. 22, 2004

(54) LAWN MOWER DISCHARGE SHUTTER

(75) Inventors: Takao Kobayashi, Wako (JP); Tetsuo Iida, Wako (JP); Hiromitsu Sasaki, Wako (JP); Kenzo Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/378,720

(22) Filed: Mar. 4, 2003

(65) Prior Publication Data
US 2003/0182915 A1 Oct. 2, 2003

(30) Foreign Application Priority Data

Mar. 26, 2002 (JP) ........................................ 2002-087037

(51) Int. Cl.[7] .......................... A01D 43/00; A01D 43/06
(52) U.S. Cl. ........................................ 56/202; 56/320.2
(58) Field of Search ............................. 56/320.2, 202, 56/320.1, 17.4, 255, 295, DIG. 17, DIG. 20, 203, 16.6

(56) References Cited

U.S. PATENT DOCUMENTS

| | | | | |
|---|---|---|---|---|
| 3,134,212 A | * | 5/1964 | Gary | 56/16.4 R |
| 3,893,284 A | * | 7/1975 | Thon et al. | 56/202 |
| 3,949,540 A | * | 4/1976 | Christopherson et al. | 56/202 |
| 4,214,424 A | * | 7/1980 | Gobin | 56/202 |
| 4,800,712 A | * | 1/1989 | Morse et al. | 56/202 |
| 5,033,260 A | * | 7/1991 | Jerry | 56/320.2 |
| 5,488,821 A | * | 2/1996 | McCunn et al. | 56/320.2 |
| 5,894,717 A | * | 4/1999 | Yamashita et al. | 56/320.1 |

FOREIGN PATENT DOCUMENTS

JP 64 3441 1/1989

\* cited by examiner

*Primary Examiner*—Árpád F. Kovács
(74) *Attorney, Agent, or Firm*—Adams & Wilks

(57) ABSTRACT

A lawn mower includes a grass discharge passage extending rearward from a housing 11. A grass receptacle is removably mounted to the discharge passage via a receptacle mounted portion. A shutter is provided at a passage opening of the grass discharge passage facing the housing. The shutter is rotatably provided within the housing to adjust the degree of opening of the passage opening. The lawn mower is switched between a bagging mode, a mulching mode and an intermediate mode by the opening control with the shutter.

3 Claims, 17 Drawing Sheets

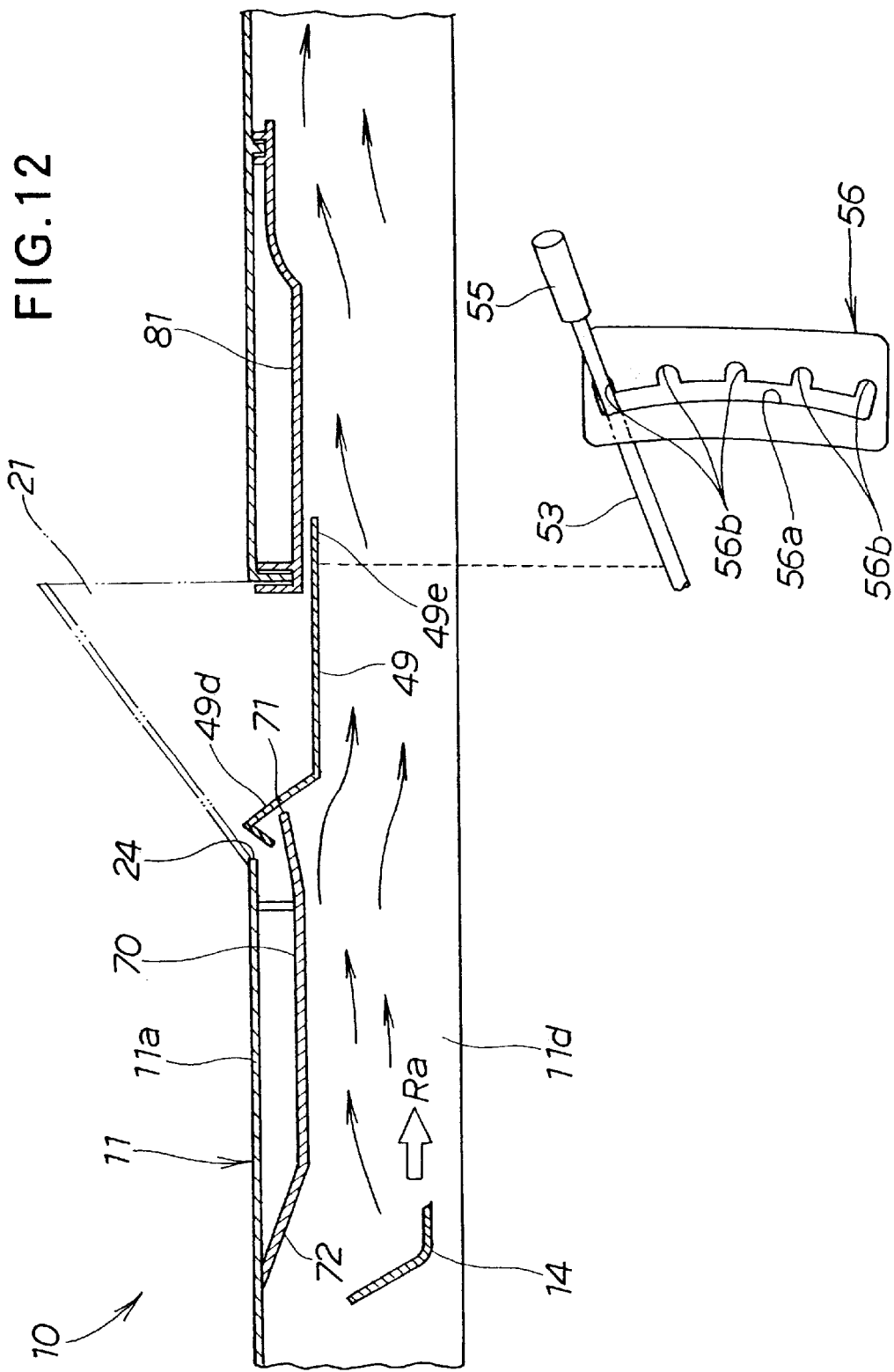

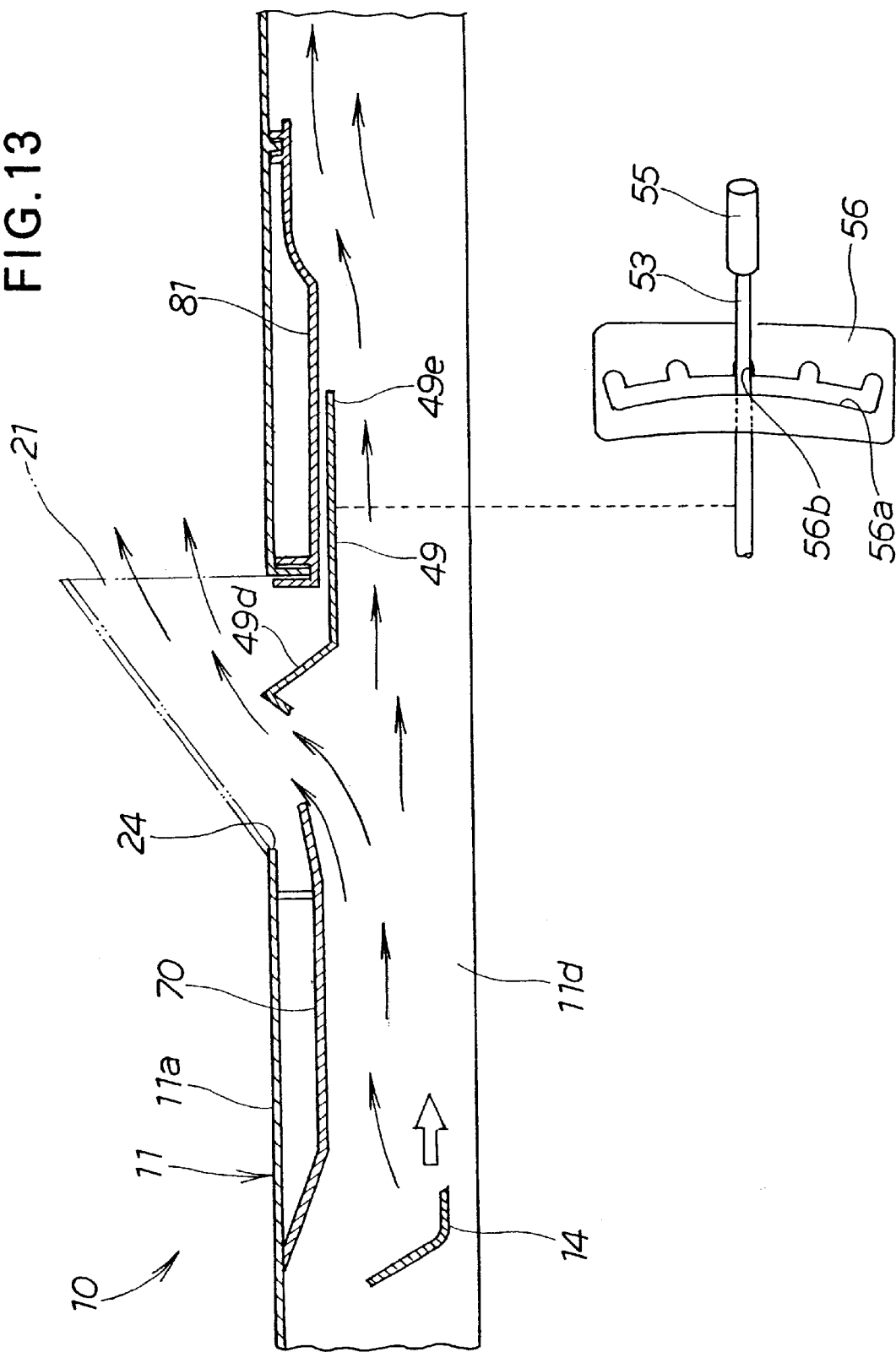

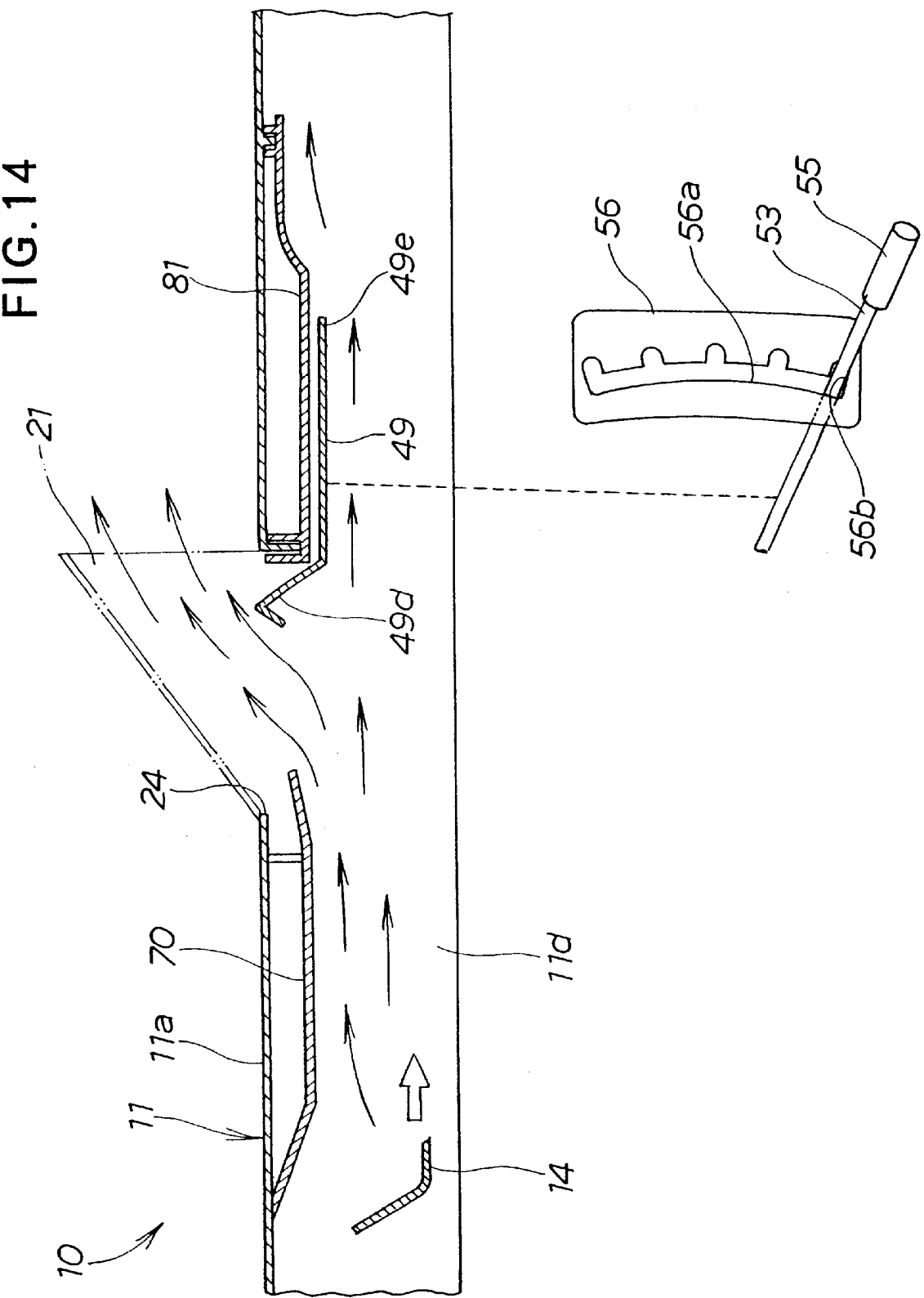

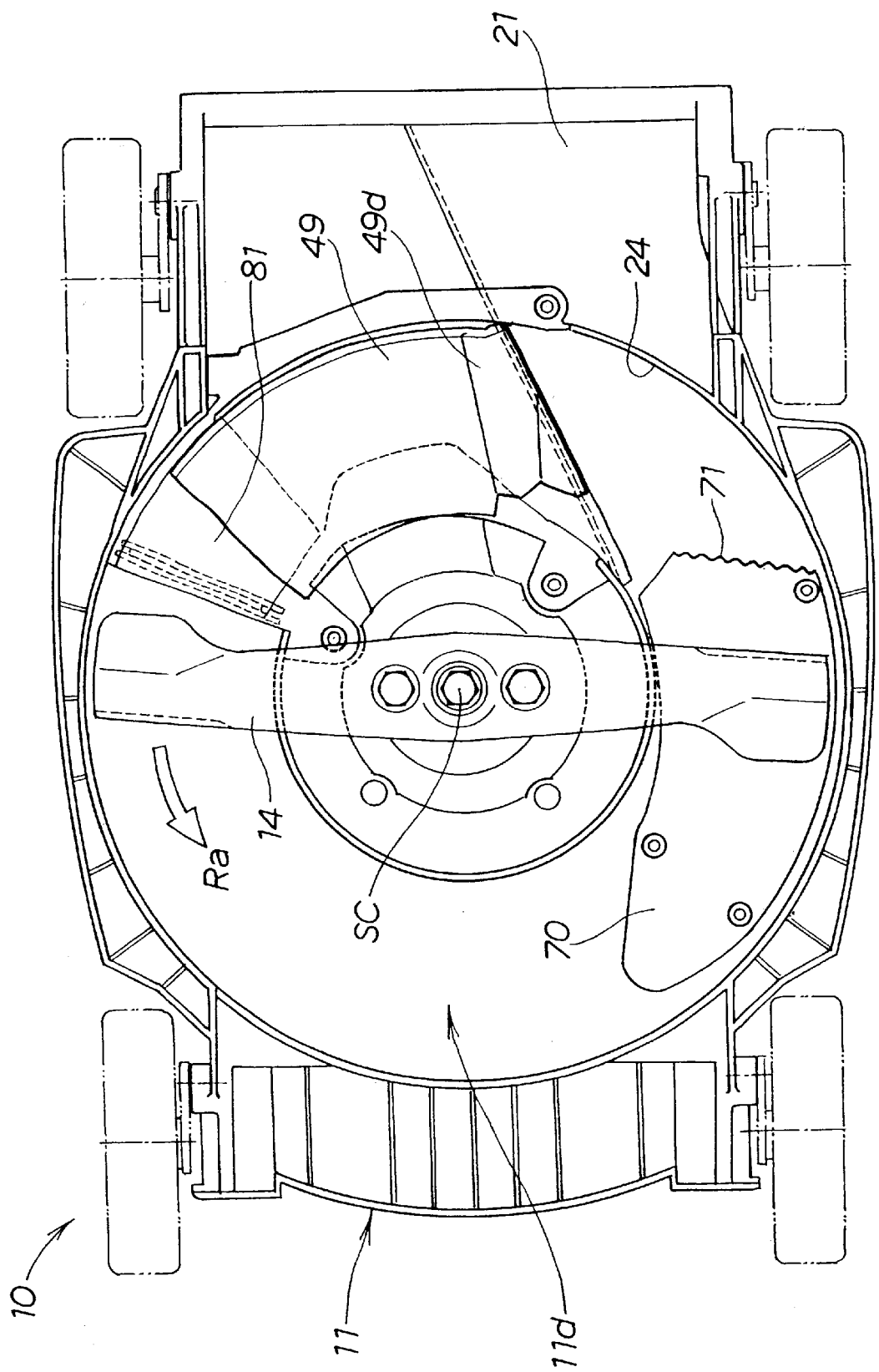

LAWN MOWER DISCHARGE SHUTTER

FIELD OF THE INVENTION

The present invention relates to an improved art of rotary lawn mowers.

BACKGROUND OF THE INVENTION

Rotary lawn mowers cut grass by rotating cutting blades housed in downward-opening housings along the grass. This kind of rotary lawn mowers include (1) lawn mowers of a type for use in a so-called bagging mode, which receive grass cut by cutting blades in grass receptacles such as bags and (2) lawn mowers of a type for use in a so-called mulching mode, which cut grass cut by cutting blades more finely within housings to discharge it downward of the housings. The bagging-mode lawn mowers can remove all cut grass (grass clippings), providing a good finished quality of grass cutting, and are thus commonly used in golf courses or the like. The mulching-mode lawn mowers can eliminate the need for the work of "dumping grass clippings" by returning grass clippings to the lawns, and are thus commonly used in parks or the like.

It is, however, inconvenient to selectively use the two types of lawn mowers, depending on the purpose. In recent years, an art of enabling a single lawn mower to operate both in a bagging mode and in a mulching mode has been developed. This kind of lawn mower is disclosed, for example, in Japanese Patent Laid-Open Publication No. SHO-64-3441 entitled "Rotary Lawn Mower."

The conventional lawn mower has a grass discharge chute mounted on a top plate of a housing and a grass discharge bag attached to the grass discharge chute so as to receive grass cut by a cutting blade in the grass discharge bag (bagging mode). The lawn mower alternatively has a cover plate mounted on the top plate of the housing to discharge grass cut by the cutting blade downward of the housing (mulching mode).

It is preferable for some lawns to be able to return some amount of grass clippings to the ground and hold the rest in the grass discharge bag. Returning part of grass clippings to fill in intrarow spacings, for example, provides good appearance and also compost to the lawns.

The conventional lawn mower, however, only switch the cover plate or the grass discharge chute to the other to put all grass clippings in the grass discharge bag or return all grass clippings to the ground, and is not applicable to an intermediate use. Further, it is required to manually change the parts to switch between the bagging mode and the mulching mode, involving troublesome changing work.

To solve the problem, it would be possible to provide an opening and closing valve at an inlet of the grass discharge bag to appropriately switch the opening and closing valve. However, only the provision of the opening and closing valve does not enable efficiently returning part of grass clippings to the ground while receiving the rest in the grass discharge bag.

Thus desired is a lawn mower which can appropriately switch between a bagging mode, a mulching mode and an intermediate mode by simple operation.

SUMMARY OF THE INVENTION

According to the present invention, there is provided a lawn mower which comprises: a power source with an output shaft extending downward; a housing provided below the power source, opening downward; a cutting blade housed in the housing and attached to the output shaft; a grass discharge passage extending rearward from the housing; a grass receptacle removably mounted to a receptacle mounted portion provided at the grass discharge passage, for receiving grass cut by the cutting blade through the grass discharge passage; and a shutter provided at a passage opening of the grass discharge passage facing the housing; wherein, the shutter is configured to be rotatable about the axis of the output shaft so as to adjust the degree of opening of the passage opening.

Since the shutter is provided at the passage opening facing the housing, of the grass discharge passage extending rearward from the downward-opening housing, and the shutter is configured to be rotatable about the axis of the output shaft of the power source, the degree of opening of the passage opening can be desirably adjusted with the shutter. Only the simple control of the shutter opening allows appropriate switching between a bagging mode in which the shutter is fully opened to receive grass clippings in the grass receptacle, a mulching mode in which the shutter is fully closed to discharge grass clippings downward of the housing, and an intermediate mode between the bagging mode and the mulching mode, in which the shutter is opened to a desired degree. It is needless to change the parts every time the mode is switched.

Further, opening the shutter to a desired degree allows minute and preferable setting of the form of discharge of grass clippings, according to lawn conditions, required finished quality, or preference. Furthermore, switching to the intermediate mode allows the reduction of the discharged flow amount of grass clippings discharged from the housing to the grass receptacle. This results in a lengthened time of accumulation of grass clippings in the grass receptacle, reducing the frequency of replacement of the grass receptacle.

The housing preferably has a scroll portion for allowing grass cut by the cutting blade to swirl within the housing while guiding it to the grass discharge passage. A guide is preferably provided along the scroll portion beneath a top plate of the housing. A rear guide end of the guide is preferably opposed to the passage opening. The rear guide end is preferably placed higher in level than the bottom of the passage opening.

Lawn mowers for use in the bagging mode generally cause grass cut by cutting blades to swirl within housings while guiding it to grass discharge passages. The shape of the bagging-mode housings is thus generally spiral.

Lawn mowers for use in the mulching mode cut grass cut by cutting blades more finely by the cutting blades within housings. The shape of the mulching-mode housings is thus generally uniform in cross-sectional shape.

The shape of the housings for use in the bagging mode is thus different from the shape of the housings for use in the mulching mode.

The lawn mower of the present invention uses the single housing to operate in the bagging mode, mulching mode and intermediate mode. The present invention provides, for efficient bagging-mode operations, in the housing the scroll portion for allowing grass clippings to swirl within the housing while directing them to the grass discharge passage. Further, for efficient mulching-mode operations, the guide is placed along the scroll portion, being provided beneath the top plate of the housing, and the rear guide end of the guide is opposed to the passage opening.

When the shutter is opened, the scroll portion and the guide allow grass clippings to swirl while smoothly guiding them to the passage opening. When the shutter is closed, the guide guides grass clippings swirling in the scroll portion for smooth flow along the closed shutter. The same applies to the intermediate mode. With the single housing, operations in the bagging mode, mulching mode and intermediate mode can thus be more efficiently performed.

In the present invention, the height of the rear guide end of the guide for directing grass clippings toward the grass discharge passage is set greater than that of the bottom of the passage opening. Thus in the intermediate mode, grass clippings swirling along the guide can be easily taken into the grass discharge passage. As a result, a required amount of grass clippings can be securely received in the grass receptacle through the grass discharge passage. Thus in the intermediate mode, the ratio between the amount of glass clippings to be held in the grass receptacle and the amount of grass clippings to be discharged downward of the housing can be relatively precisely set. The workability in the intermediate mode can be further improved.

The rear guide end of the guide is preferably formed in a wave shape.

When the cutting blade is rotated, an air flow is generally produced along the guide below the guide. This flow tends to become a vortex flow at the rear guide end. When the vortex flow is excessive, grass clippings are likely to be drawn into the vortex flow. As a result, in the bagging mode or the intermediate mode, the grass clippings have difficulty in flowing into the passage opening.

In the present invention, as described above, the rear guide end of the guide has a wave shape. Thus air flows at depressions in the wave shape interfere with air flows at projections to reduce the generation of vortex flows, resulting in a straightened air flow flowing into the passage opening. As a result, in the bagging mode or the intermediate mode, grass clippings easily flow into the passage opening. Grass clippings are thus allowed to smoothly flow into the grass receptacle through the grass discharge passage to be more securely received.

BRIEF DESCRIPTION OF THE DRAWINGS

Preferred embodiments of the present invention will be described in detail below, by way of example only, with reference to the accompanying drawings, in which:

FIG. 12 is a cross-sectional view taken along line 12—12 in FIG. 8;

FIG. 13 is a cross-sectional view corresponding to FIG. 12, illustrating a shutter in an intermediate mode;

FIG. 14 is a cross-sectional view corresponding to FIG. 12, of the shutter in a fully-opened state;

FIG. 17 is a bottom view of the lawn mower with the shutter in the fully-opened state.

DETAILED DESCRIPTION OF THE PREFERRED EMBODIMENTS

Figure 1:
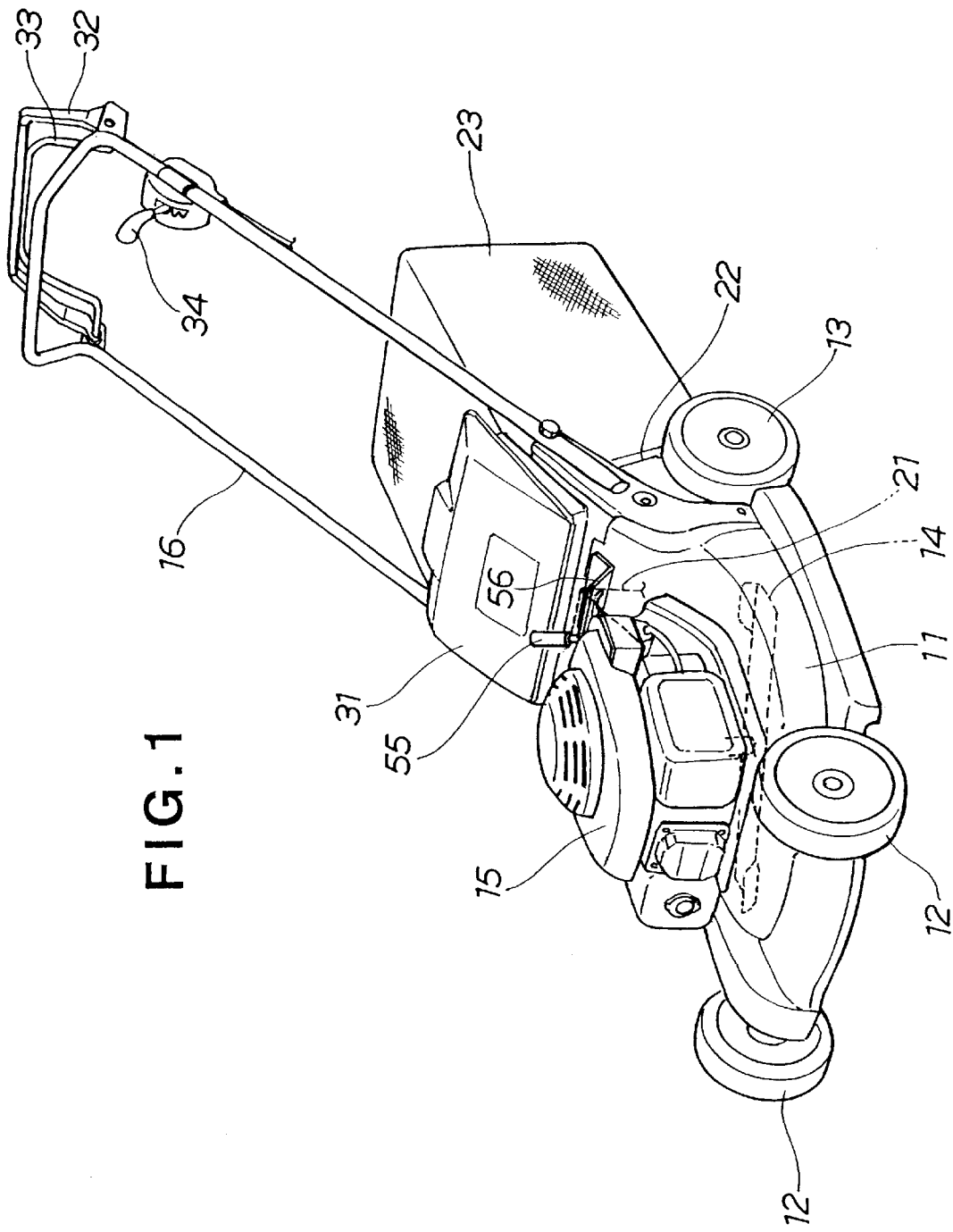
FIG. 1 is a perspective view of a lawn mower according to the present invention.

As shown in FIG. 1, a lawn mower 10 of the present invention is a walk-behind self-propelled working machine to cut grass while walking. The lawn mower 10 has a housing 11 as a machine body, left and right front wheels 12, 12 provided at the front of the housing 11, left and right rear wheels 13, 13 as driving wheels provided at the rear of the housing 11, a grass cutting blade 14 provided in an inner central portion of the housing 11, an engine 15 provided on the top of the housing 11 for driving the rear wheels 13, 13 and the cutting blade 14, a continuously variable transmission (not shown) provided between the engine 15 and the rear wheels 13, 13 in a rear inner portion of the housing 11, and an operating handle 16 extending rearward from the housing 11. A lower portion of the housing 11 opens downward.

Figure 2:
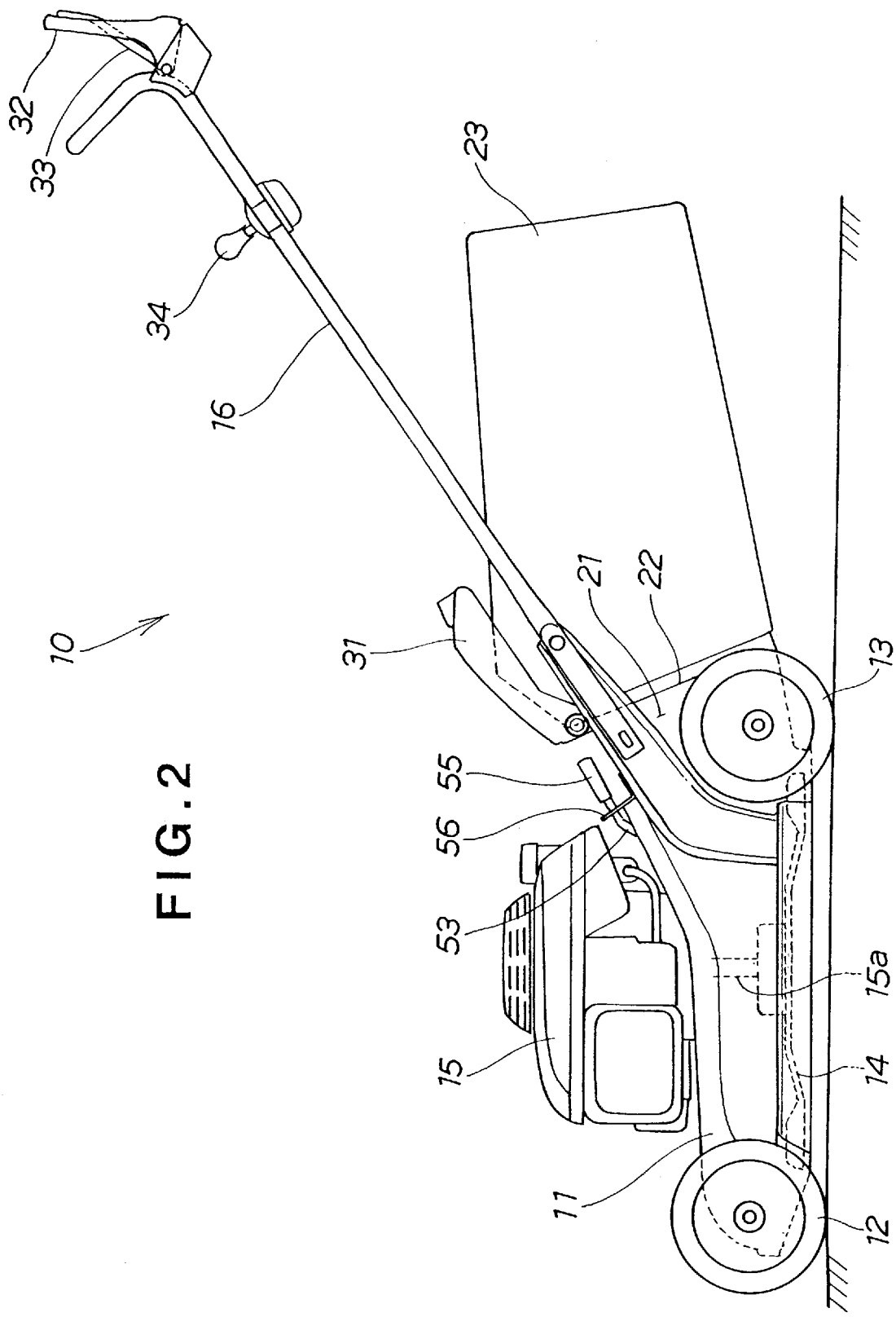
FIG. 2 is a left side view of the lawn mower according to the invention.

As shown in FIG. 2, the engine 15 as a power source has an output shaft 15a extending downward. The housing 11 is provided below the engine 15. The cutting blade 14 is housed in the housing 11, being attached to the output shaft 15a. A grass discharge passage 21 extends rearward from the housing 11. A receptacle mounted portion 22 is provided at the grass discharge passage 21. A grass receptacle 23 such as a grass bag is removably mounted to the receptacle mounted portion 22. Grass cut by the cutting blade 14 (hereinafter referred to as "grass clippings") is received in the grass receptacle 23 through the grass discharge passage 21.

A receptacle cover 31 is attached to a rear upper portion of the housing 11 in an upwardly and downwardly swingable manner. The operating handle 16 has a cutting blade clutch lever 32, a drive clutch lever 33 and a speed change lever 34.

Figure 3:
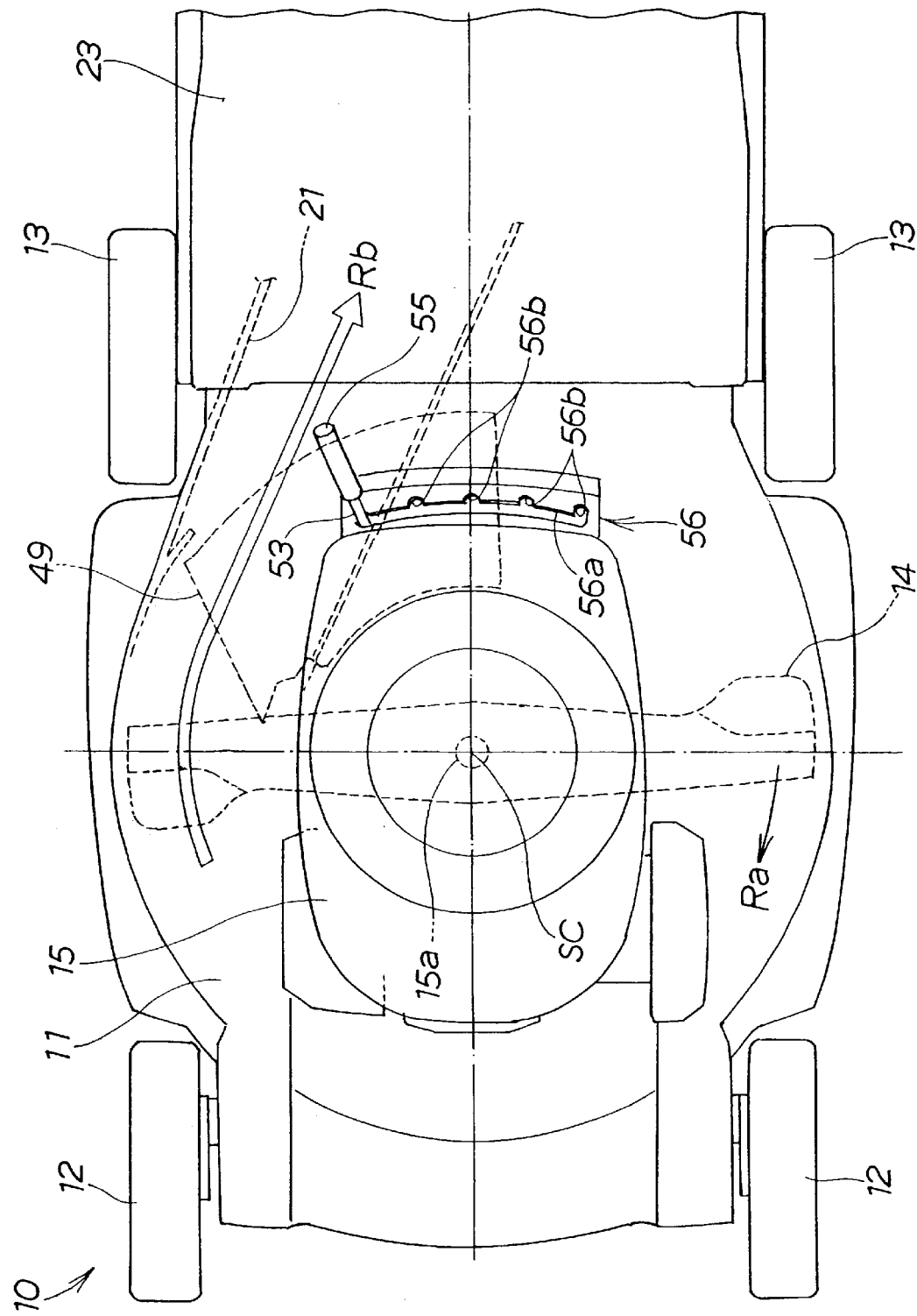
FIG. 3 is a plan view of the lawn mower according to the invention.

As shown in FIG. 3, the lawn mower 10 in this embodiment cuts grass by rotating the cutting blade 14 in a clockwise direction as shown by an arrow Ra, producing an air flow as shown by an arrow Rb within the housing 11, and transmitting grass clippings into the grass receptacle 23. The lawn mower 10 is self-propelled forward to proceed with the grass cutting operation.

A control guide 56 is provided on a rear upper surface of the housing 11. The control of an opening control lever 53 to be described later is guided along the control guide 56. The control guide 56 has a guide long hole 56a extending transversely of the lawn mower 10, through which the opening control lever 53 is inserted. The guide long hole 56a has a plurality of (e.g., five) location notches 56b for positioning the opening control lever 53.

Figure 4:
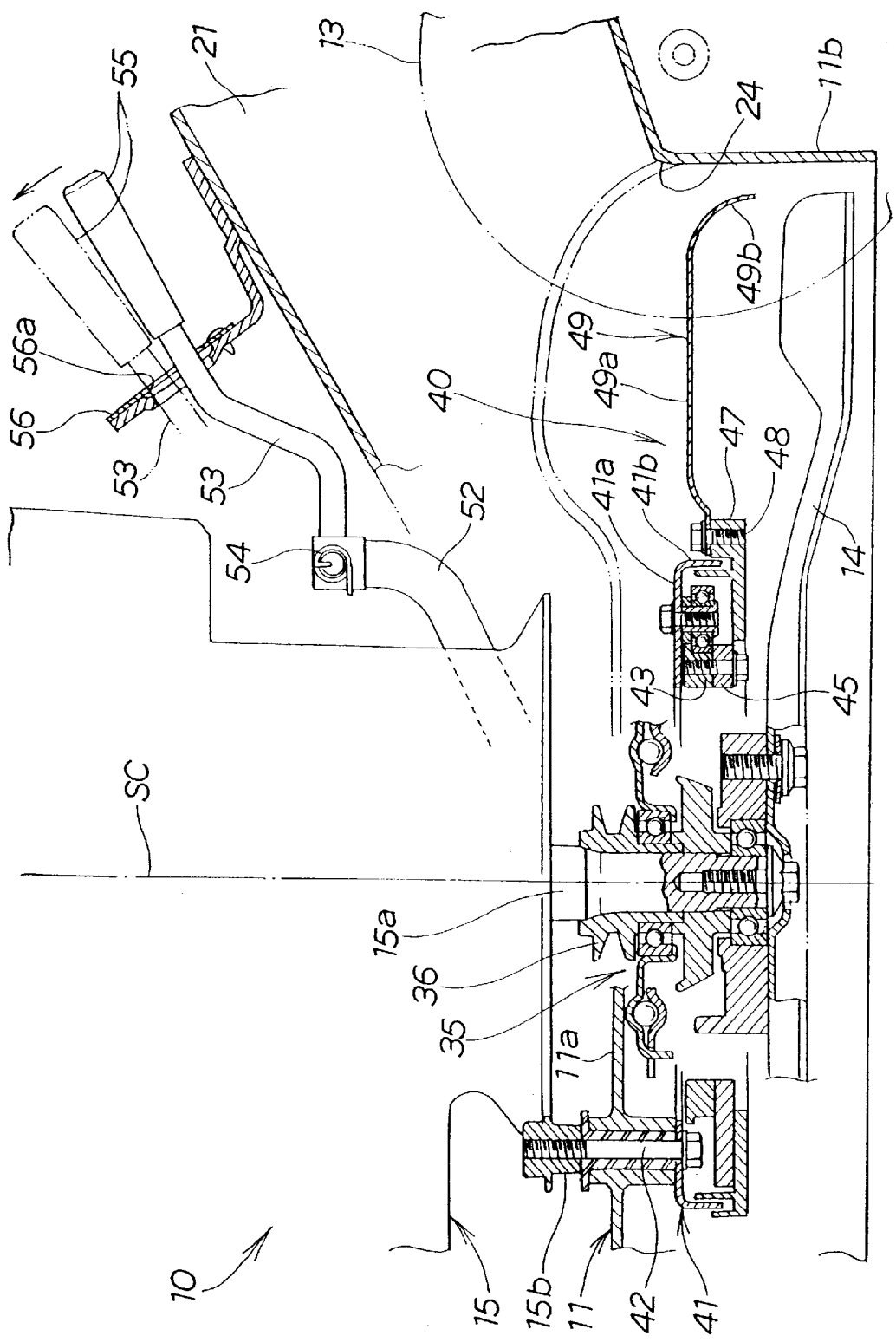
FIG. 4 is a cross-sectional view of an essential part of the lawn mower according to the invention.

Referring to FIG. 4, the cutting blade 14 is attached to the vertical output shaft 15a of the engine 15 via a clutch 35. A drive pulley 36 for driving the continuously variable transmission (not shown) is attached to the cutting blade 14. The grass discharge passage 21 extends rearward and upward from the housing 11.

The engine 15, the housing 11 and a cover plate 41 are joined into a unit by fastening, with a plurality of (e.g., four) bolts 42, a top plate 11a of the housing 11 and the cover plate 41 below the top plate 11a to a case bottom 15b of the engine 15 in a superimposed manner. The cover plate 41 consists of a top plate 41a and a peripheral portion 41b. The top plate 41a is a horizontal annular plate centered on the shaft center SC of the output shaft 15a. The peripheral portion 41b extends downward from the rim of the top plate 41a.

The lawn mower 10 of this embodiment is characterized in that a shutter 49 is provided at a passage opening 24 of the grass discharge passage 21 facing the housing 11, being rotatable about the shaft center SC of the output shaft 15a, so that the degree of opening of the passage opening 24 is adjusted with the shutter 49. The shutter 49 is operated for rotation by the opening control lever 53. A shutter mechanism 40 including the shutter 49 will be described in detail below.

Figure 5:
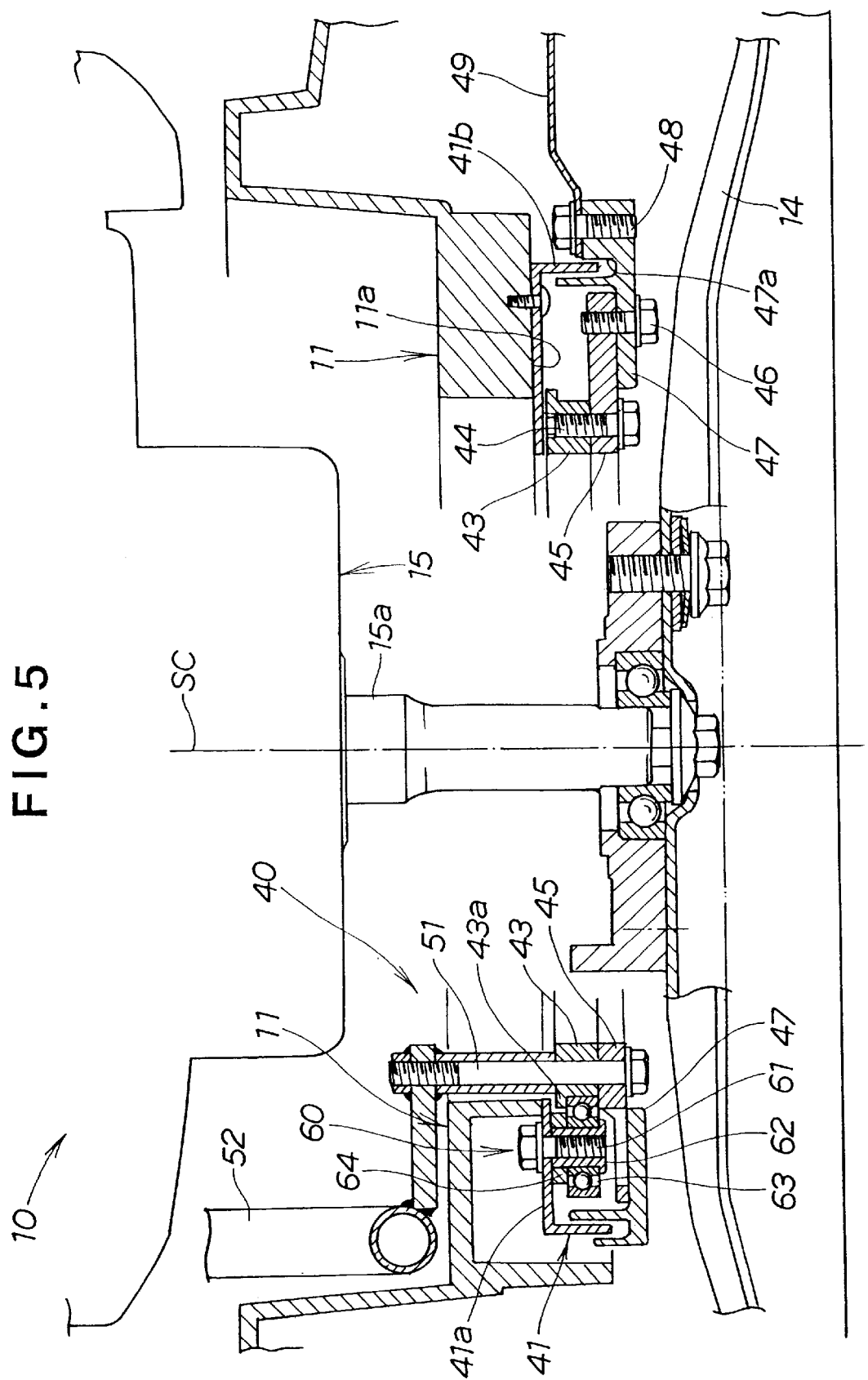
FIG. 5 is a cross-sectional view of a shutter mechanism according to the invention.

The shutter mechanism 40 consists of, as shown in FIG. 5, the cover plate 41 fixedly and integrally mounted to the housing 11, a first rotatable disc 43 rotatably mounted to the undersurface of the top plate 41a of the cover plate 41, a second rotatable disc 45 mounted on the undersurface of the first rotatable disc 43 with a plurality of bolts 44, a third rotatable disc 47 mounted on the undersurface of the second rotatable disc 45 via a plurality of bolts 46, the shutter 49 mounted on an edge portion of the third rotatable disc 47 with a plurality of bolts 48, an arm 52 attached at its proximal end to the first rotatable disc 43 with a plurality of bolts 51, the opening control lever 53 (see FIG. 4) coupled to the distal end of the arm 52, and the control guide 56 (see FIG. 4).

The first, second and third rotatable discs 43, 45 and 47 are annular horizontal plates arranged concentrically with the shaft center SC.

A mechanism for rotatably mounting the first rotatable disc 43 to the top plate 41a of the cover plate 41 consists of a plurality of (e.g., three) rotation supporters 60 arranged on the undersurface of the top plate 41a in a concentric circle about the shaft center SC.

The rotation supporters 60 each consist of a collar tube 62 fastened to the top plate 41a with a bolt 61 in parallel with the shaft center SC, and a rolling bearing 63 (e.g., ball bearing) with its inner ring fitted onto the peripheral surface of the collar tube 62.

The rolling bearing 63 is prevented from displacement with the collar of the collar tube 62. The first rotatable disc 43 is prevented from displacement by placing an upper collar 43a of the first rotatable disc 43 on the top of the outer rings of the rolling bearings 63.

In this manner, the first rotatable disc 43 is mounted to the cover plate 41 rotatably about the shaft center SC. Reference numeral 64 denotes a spacer. The rotation supporters 60 may be cam followers.

The third rotatable disc 47 has an upward-opening peripheral groove 47a formed on its upper edge portion. The peripheral portion 41b of the cover plate 41 is inserted into the peripheral groove 47a with a small clearance, providing a labyrinth seal structure. The increased sealing of the gap between the peripheral part of the fixed cover plate 41 and the peripheral part of the third rotatable disc 47 can prevent grass clippings from entering radially inward through the gap. Thus grass clippings cannot engagingly get between the rolling bearings 63 and the first rotatable disc 43. Grass clippings swirl within the housing 11 under centrifugal force. Grass clippings cannot engagingly get between the rolling bearings 63 and the first rotatable disc 43 from the axis of rotation.

As shown in FIG. 4, the opening control lever 53 is attached to the arm 52 vertically swingably while being limited in lateral swing. The opening control lever 53 is always put in a neutral position with a return spring 54 (e.g., torsion spring) as shown in solid lines.

The shutter 49 is a member formed by bending a plate material. The shutter 49 consists of a horizontal portion 49a extending from the edge of the third rotatable disc 47 toward an outer tubular portion 11b of the housing 11, and a vertical portion 49b extending downward from the distal end of the horizontal portion 49a in a curve along the outer tubular portion 11b.

Figure 6:
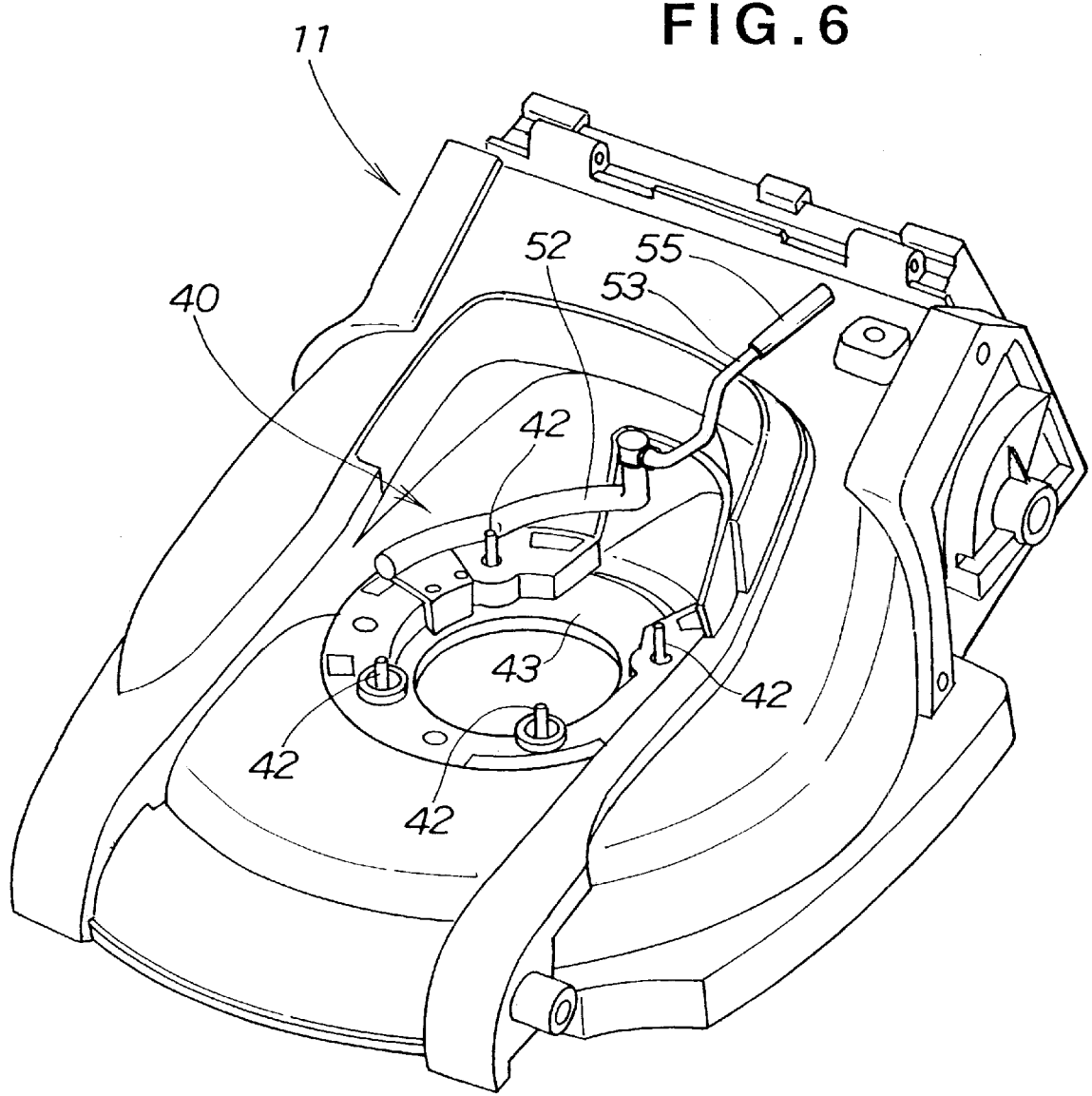
FIG. 6 is a perspective view of a housing, an opening control lever and surrounding parts according to the invention.

FIG. 6 shows the housing 11, the opening control lever 53 and surrounding parts, that is, the relationship between the first rotatable disc 43, the arm 52 and the opening control lever 53. Reference numeral 55 denotes a grip. The housing 11 and the shutter mechanism 40 are mounted to the engine with the four bolts 42.

Figure 7:
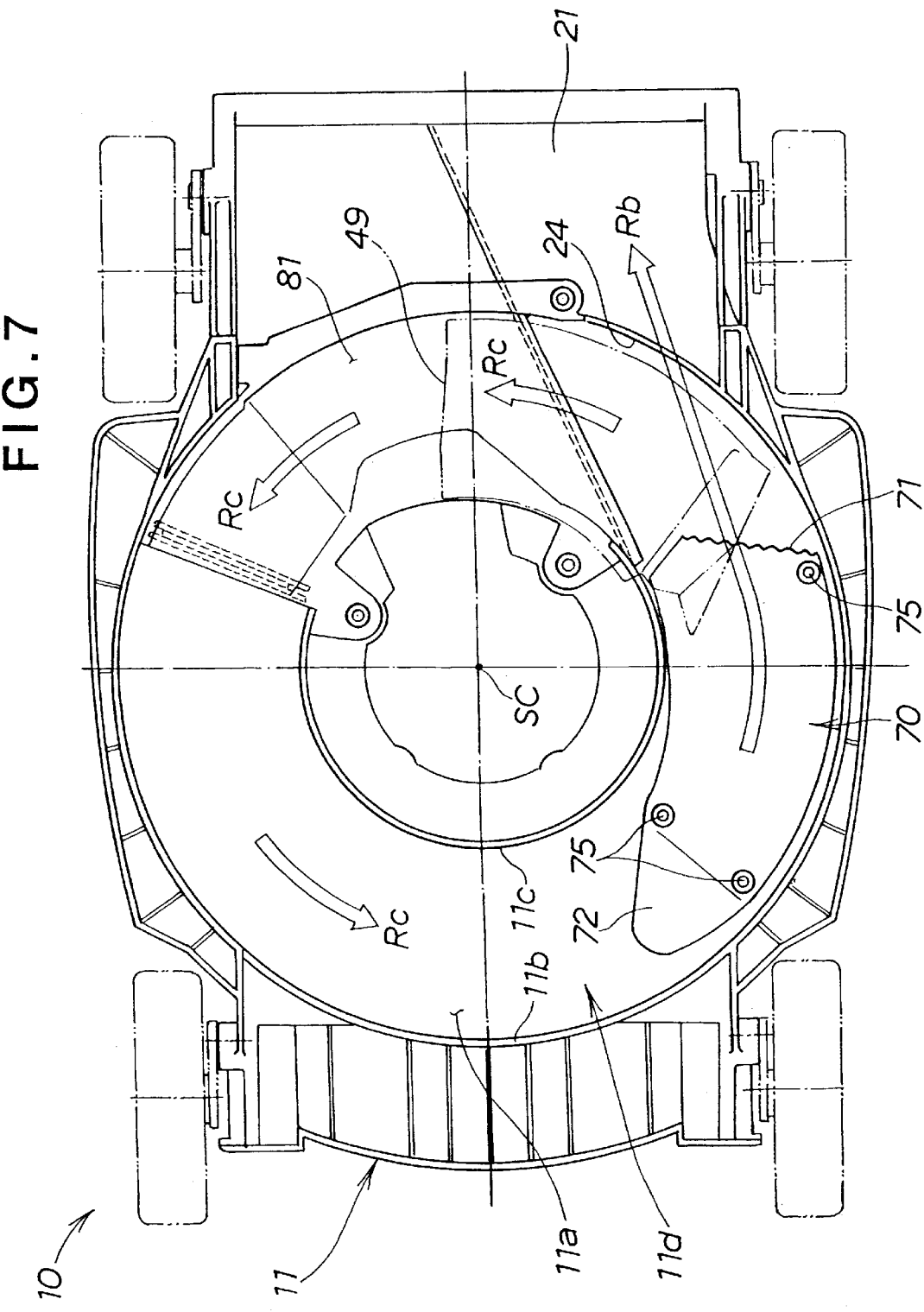
FIG. 7 is a bottom view of the lawn mower according to the invention with a cutting blade removed.

FIG. 7 shows the bottom of the lawn mower 10 with the cutting blade and the shutter mechanism removed.

The housing 11 is a spiral case or scroll case with a scroll portion 11d for allowing grass clippings to swirl within the housing 11 while directing them to the grass discharge passage 21 as shown by the arrow Rb in the bagging mode. More specifically, the housing 11 has the outer tubular portion 11b and an inner tubular portion 11c with a diameter smaller than that of the outer tubular portion 11b, which are cylindrical in shape, being disposed concentrically with the shaft center SC. The grass discharge passage 21 is extended rearward from the outer tubular portion 11b, tangentially to the outer tubular portion 11b. The scroll portion 11d is a space enclosed by the top plate 11a, the outer tubular portion 11b and the inner tubular portion 11c, communicating with the passage opening 24 of the grass discharge passage 21 facing the housing 11.

The housing 11 allows glass clippings to sufficiently swirl within the housing 11 as shown by arrows Rc, to provide an efficient mulching-mode operation. More specifically, a guide 70 is placed along the scroll portion 11d, being provided beneath the top plate 11a of the housing 11, and a rear guide end 71 of the guide 70 is opposed to the passage opening 24. As a result, the cross-sectional shape of a portion with the scroll portion 11d of the housing 11 taken along a line passing through the shaft center SC is generally equal to that of a portion without the scroll portion 11d. Reference numeral 81 denotes a scroll plate.

Figure 8:
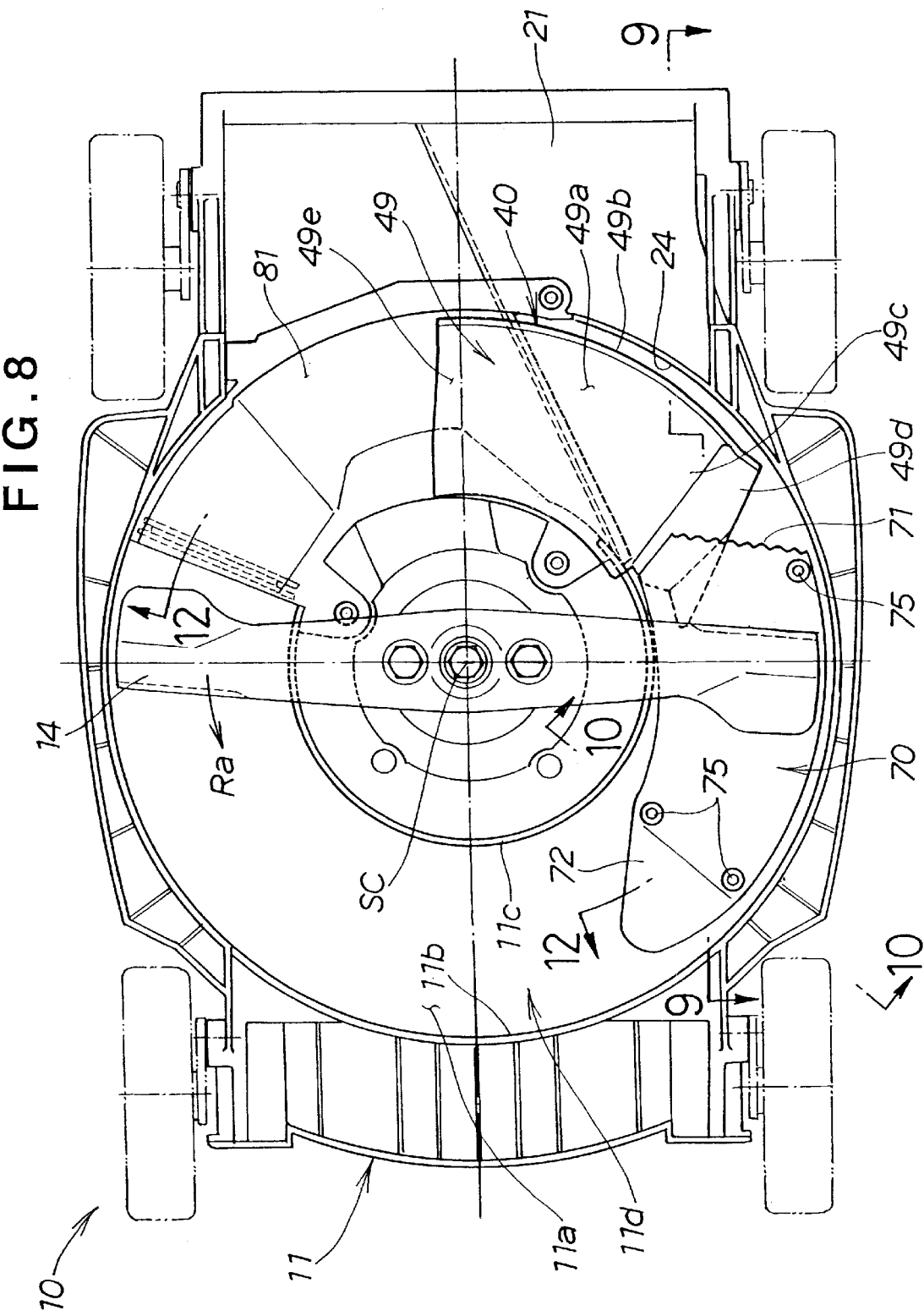
FIG. 8 is a bottom view of the lawn mower according to the invention with the cutting blade mounted.

FIG. 8 shows the lawn mower 10 with the cutting blade 14 and the shutter mechanism 40 mounted.

The shutter 49 is formed in a generally arc shape when viewed from the bottom, to be rotatable along the scroll portion 11d. The shutter 49 has a lapped portion 49d formed at an opening-closing front end 49c opposite to the guide rear end 71. An opening-closing rear end 49e of the shutter 49 extends beneath the scroll plate 81 in an overlapping manner.

Figure 9:
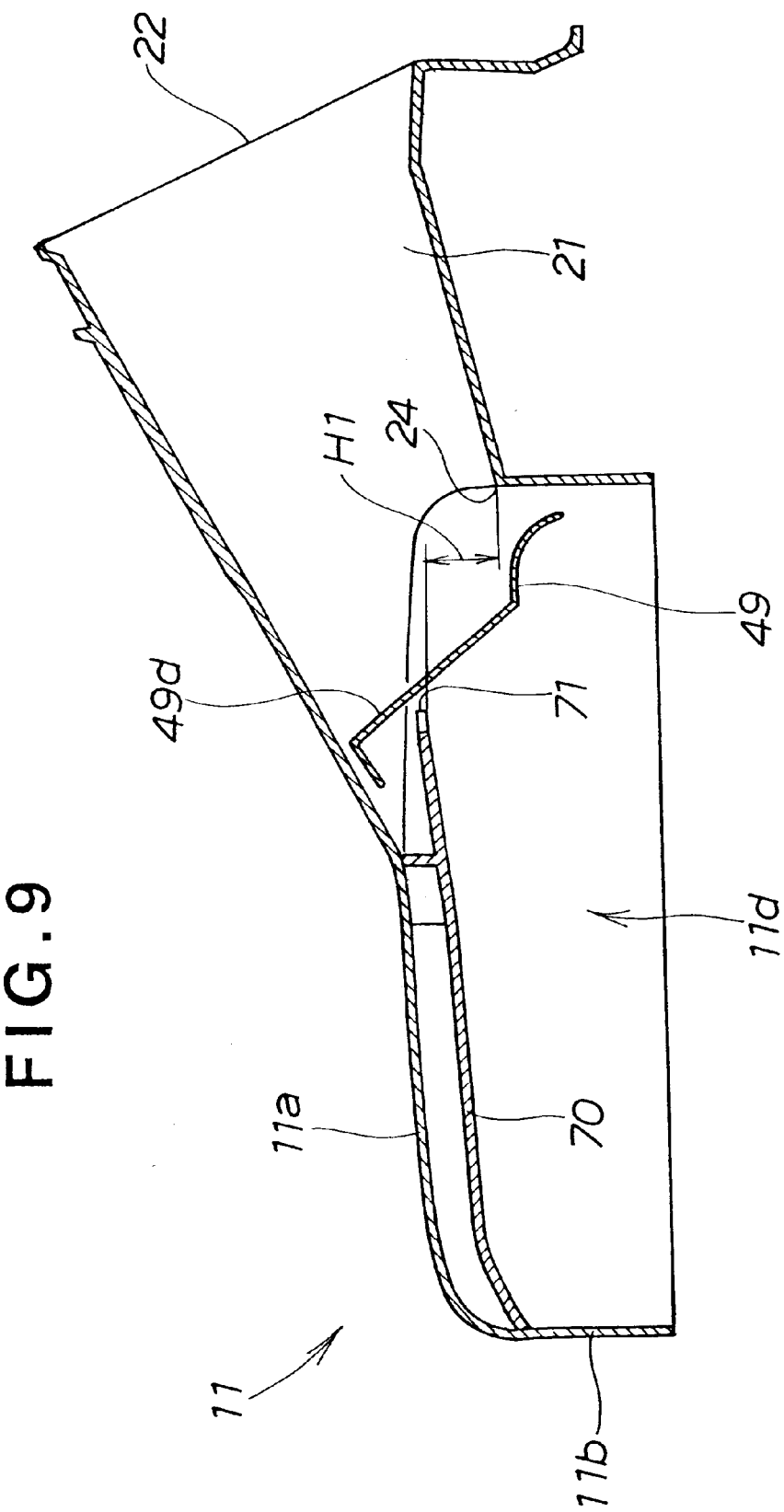
FIG. 9 is a cross-sectional view taken along line 9—9 in FIG. 8.

As shown in FIG. 9, the grass discharge passage 21 extends rearward and upward from the housing 11. The receptacle mounted portion 22 is provided at the grass discharge passage 21. The guide 70 is provided below the top plate 11a of the housing 11 with a certain clearance within the scroll portion 11d.

The height of the rear guide end 71 of the guide 70 is set greater by a height H1 than that of the bottom of the passage opening 24. Thus in the intermediate mode, grass clippings swirling along the guide 70 is easily taken into the grass discharge passage 21. As a result, a predetermined amount of grass clippings can be securely put in the grass receptacle 23 through the grass discharge passage 21 (see FIG. 1). The ratio between the amount of glass clippings to be held in the grass receptacle 23 and the amount of grass clippings to be discharged downward of the housing 11 can be relatively precisely set in the intermediate mode. The workability in the intermediate mode can thus be further improved.

Figure 10:
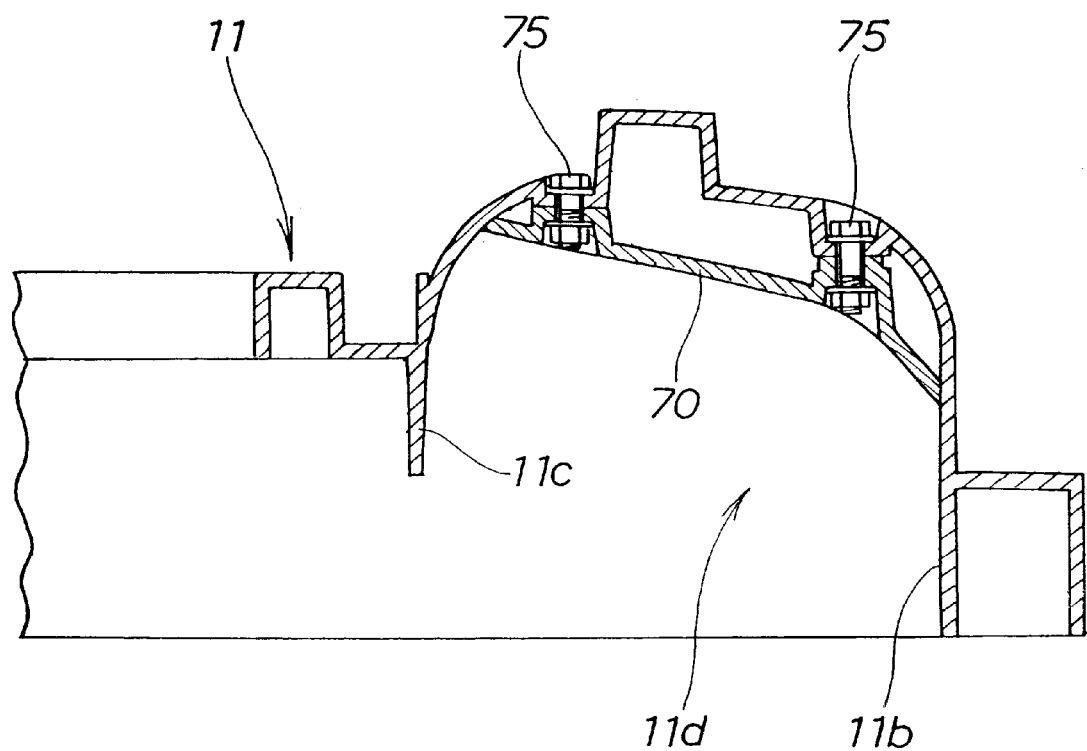
FIG. 10 is a cross-sectional view taken along line 10—10 in FIG. 8.

As shown in FIG. 10, the guide 70 is secured to the housing 11 with a plurality of bolts 75.

Figure 11A:
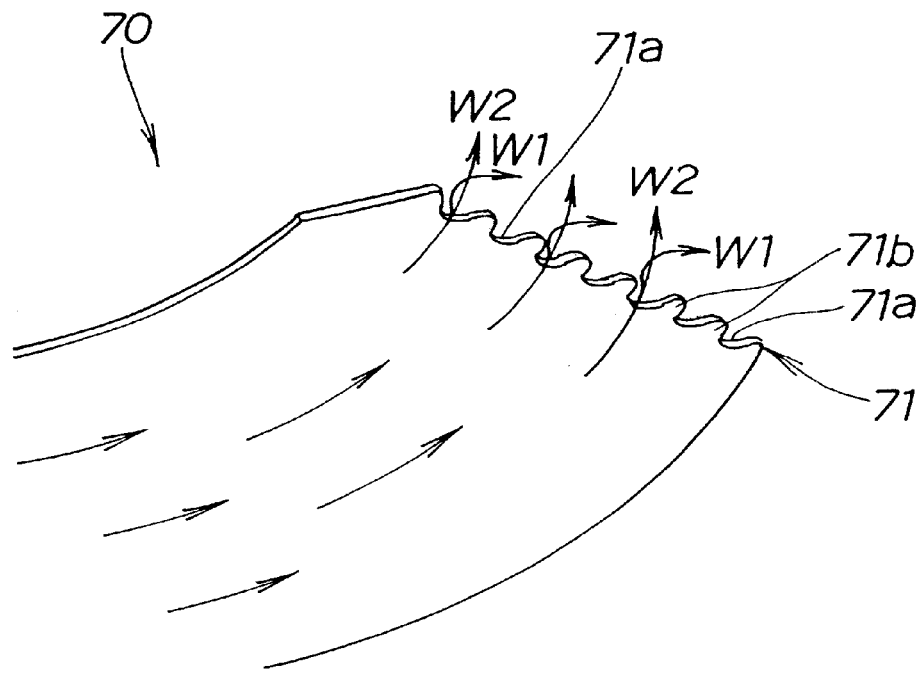
FIGS. 11A and 11B are a perspective view and a cross-sectional view illustrating a rear guide end of a guide and a surrounding part.

The rear guide end 71 of the guide 70 of a flat plate has, as shown in FIG. 11A, a plurality of depressions 71a and a plurality of projections 71b which are alternately arranged in a wave shape.

When the cutting-blade 14 is rotated as shown in FIG. 8, an air flow is produced generally along the guide 70 below the guide 70. This flow tends to become a vortex flow at the rear guide end 71. When the vortex flow is excessive, grass clippings are likely to be drawn into the vortex flow. The grass clippings thus have difficulty in flowing into the passage opening 24 in the bagging mode or the intermediate mode.

Figure 11B:
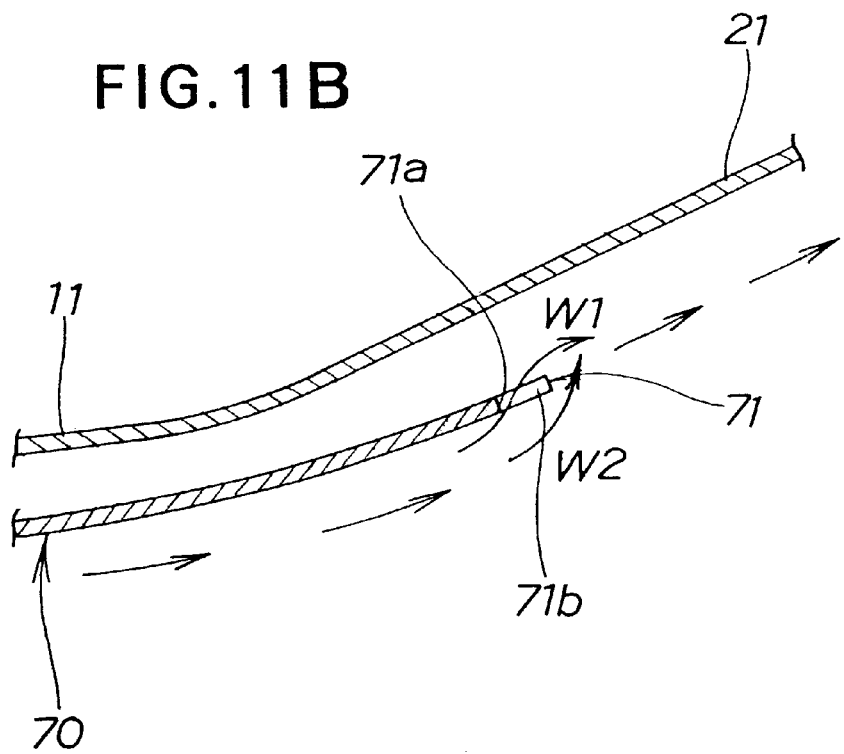

In the present embodiment, as shown in FIGS. 11A and 11B, the wave-shaped rear guide end 71 of the guide 70 causes interference between air flows W1 at the depressions 71a in the wave shape and air flows W2 at the projections 71b to reduce the generation of vortex flows, straightening an air flow flowing into the passage opening 24. As a result, in the bagging mode or the intermediate mode, grass clippings more easily flow into the passage opening 24. Grass clippings are thus allowed to smoothly flow into the grass receptacle 23 (see FIG. 1) through the grass discharge passage 21 (see FIG. 8), being more securely received.

FIG. 12 illustrates in development the relationship between the housing 11, the cutting blade 14, the passage opening 24 of the grass discharge passage 21, the shutter 49, the guide 70 and the scroll plate 81. The shutter 49 has the lapped portion 49d folded back toward the upper surface of the guide 70, at its opening-closing front end 49c opposed to the guide rear end 71. As shown in FIG. 12, when the shutter 49 is fully closed, a part of the lapped portion 49d overlaps the rear guide end 71. A front end portion 72 of the guide 70 is inclined to abut at its end on the undersurface of the top plate 11a.

As shown in FIG. 12, the guide 70 and the scroll plate 81 are spaced along the scroll portion 11d on the opposite sides of the passage opening 24. The front end portion 72 of the guide 70 provided beneath the top plate 11a of the housing 11 is inclined to abut on the undersurface of the top plate 11a. The rear guide end 71 of the guide 70 is opposed to the passage opening 24. The height of the guide 70 and the scroll plate 81 within the scroll portion 11d is substantially equal to the height of the shutter 49. Thus variation in cross-section of the scroll portion 11d (variation in cross-sectional shape and dimension) is relatively small despite the provision of the grass discharge passage 21 in the housing 11 and the provision of the shutter 49 in the scroll portion 11d. As a result, the scroll portion 11d allows air and grass clippings to smoothly and sufficiently swirl.

The control guide 56 is a member serving as a guide for the opening control lever 53 to control the degree of opening of the shutter 49, having the five location notches 56b. The location notch 56b at one end of the guide long hole 56a is a full-close position of the shutter 49. The location notch 56b at the other end of the guide long hole 56a is a full-open position of the shutter 49. The spacing between adjacent location notches 56b is set to correspond to a 25% opening of the shutter 49, for example.

Now the function of the lawn mower 10 of the above structure will be described with reference to FIGS. 12 to 17.

FIG. 12 illustrates that the opening control lever 53 is placed in the full-close position to put the shutter 49 in a full-close position (0% opening). Closing the passage opening 24 with the shutter 49 sets the lawn mower 10 in a form for use in the mulching mode. Grass cut by the cutting blade 14 is cut more finely within the housing 11 to be discharged downward of the housing 11.

As shown in FIG. 13, the opening control lever 53 is placed in a half-open position to put the shutter 49 in a half-open position (50% opening). Opening the passage opening 24 by a desired degree of opening with the shutter 49 sets the lawn mower 10 in a form for use in the intermediate mode (mode intermediate between the bagging mode and the mulching mode). Part of grass cut by the cutting blade 14 is returned to the ground and the rest is held in the grass receptacle 23 (see FIG. 1).

FIG. 14 illustrates that the opening control lever 53 is placed in the full-open position to put the shutter 49 in a full-open position (100% opening). Fully opening the passage opening 24 sets the lawn mower 10 in a form for use in the bagging mode. Grass cut by the cutting blade 14 is received in the grass receptacle 23 (see FIG. 1).

In this manner, the shutter 49 is provided at the passage opening 24 facing the housing 11, of the grass discharge passage 21 extending rearward from the downward-opening housing 11. The shutter 49 is configured to be rotatable about the shaft center SC (see FIG. 8), so that the degree of opening of the passage opening 24 can be desirably adjusted with the shutter 49. Only controlling the opening of the shutter 49 with a simple configuration allows appropriate switching between the bagging mode in which the shutter 49 is fully opened to receive grass clippings in the grass receptacle 23 (see FIG. 1), the mulching mode in which the shutter 49 is fully closed to discharge grass clippings downward of the housing 11, and the intermediate mode between the bagging mode and the mulching mode, in which the shutter 49 is opened to a desired degree. It is needless to change the parts every time the mode is switched.

Further, opening the shutter 49 to a desired degree allows minute and preferable setting of the form of discharge of grass clippings, according to lawn conditions, required finished quality, or preference. Furthermore, switching to the intermediate mode allows the reduction of the discharged flow amount of grass clippings discharged from the housing 11 to the grass receptacle 23. This results in a lengthened time of accumulation of grass clippings in the grass receptacle 23, reducing the frequency of replacement of the grass receptacle 23.

For efficient operations in the bagging mode, the housing 11 has the scroll portion 11d for allowing grass clippings to swirl within the housing 11 while directing them to the grass discharge passage 21. Also for efficient operations in the mulching mode, the guide 70 is placed along the scroll portion 11d, being provided beneath the top plate 11a of the housing 11, and the rear guide end 71 of the guide 70 is opposed to the passage opening 24.

Thus, when the shutter is opened as shown in FIG. 14, the scroll portion 11d and the guide 70 allow grass clippings to swirl while being smoothly guided to the passage opening 24. When the shutter 49 is closed as shown in FIG. 12, grass clippings swirling in the scroll portion 11d can be guided by the guide 70 to smoothly flow along the shutter 49 in the closed state. The same is true in the intermediate mode. In this manner, operations in the bagging mode, mulching mode and intermediate mode can be more efficiently performed with the single housing 11.

Figure 15:
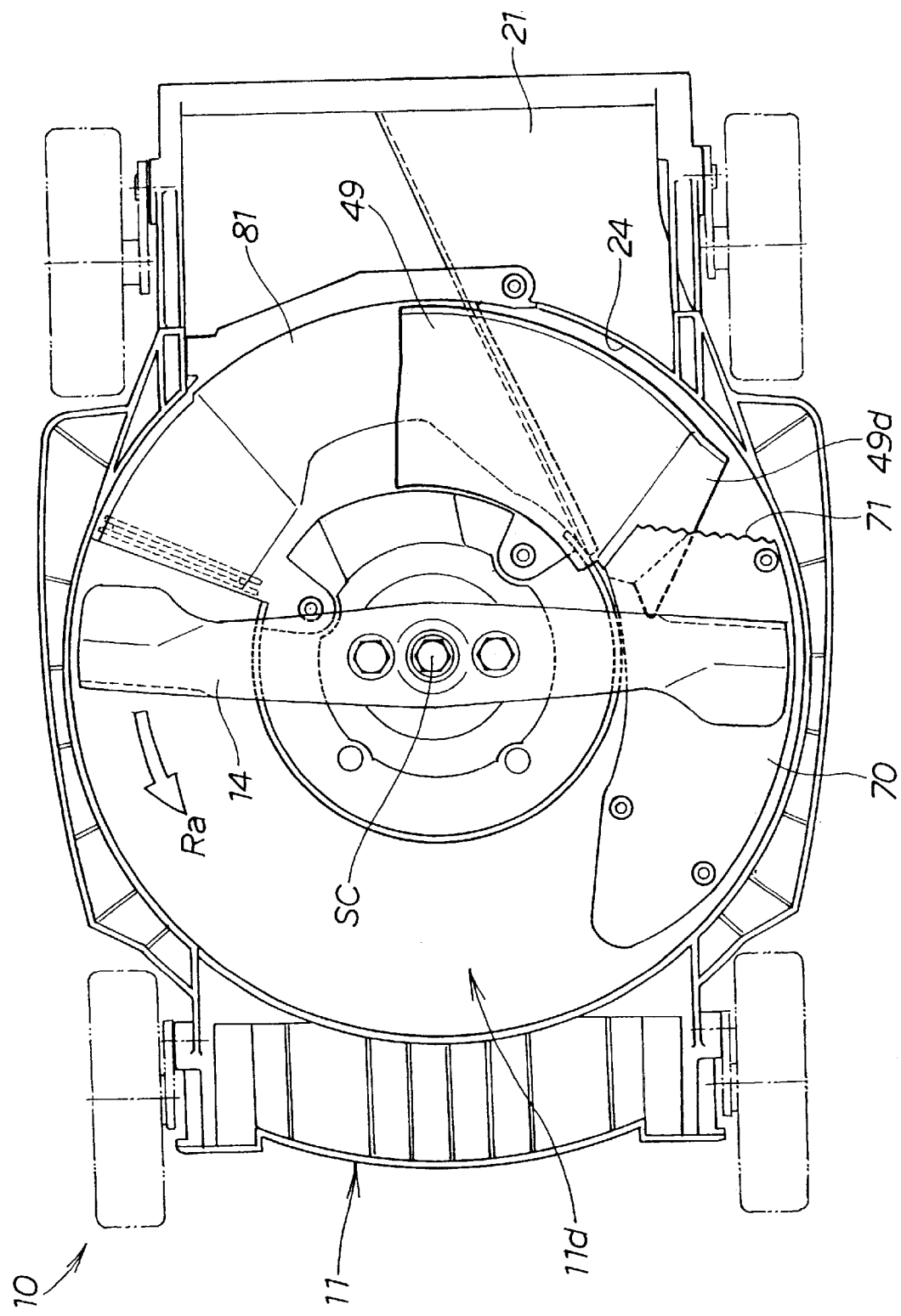
FIG. 15 is a bottom view of the lawn mower with the shutter in a fully-closed state.
Figure 16:
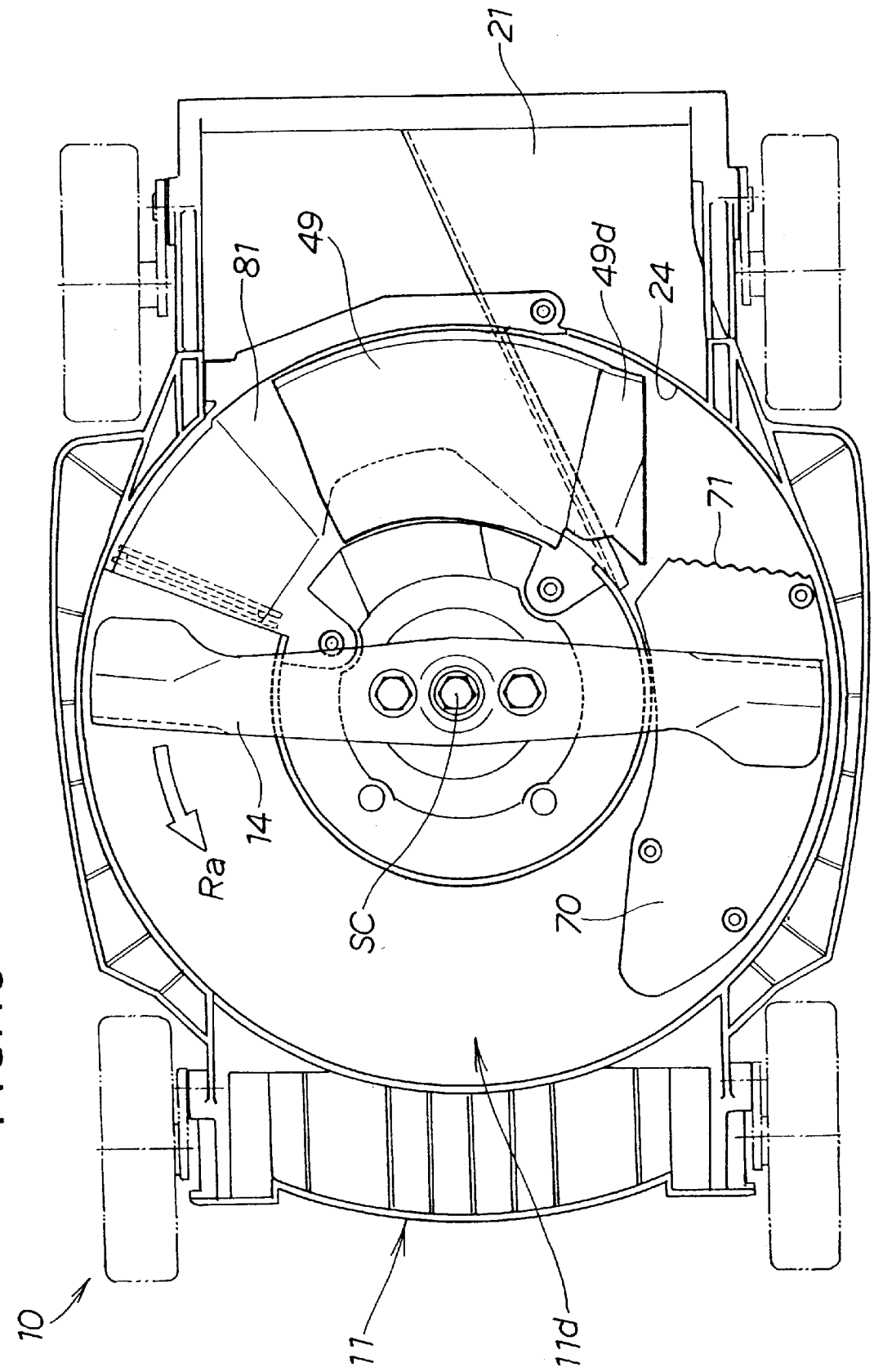
FIG. 16 is a bottom view of the lawn mower with the shutter in the intermediate mode.

FIG. 15 illustrates the state wherein the shutter 49 is placed in the fully-closed position. FIG. 16 illustrates the state wherein the shutter 49 is placed in the half-opened position. FIG. 17 illustrates the state wherein the shutter 49 is placed in the fully-opened position.

As shown in FIG. 8, the housing 11 has the outer tubular portion 11b cylindrical about the shaft center SC, the grass discharge passage 21 being extended tangentially to the outer tubular portion 11b, and the shutter 49 being provided at the passage opening 24 opposed to the outer tubular portion 11b. The direction of the grass discharge passage 21 extending from the outer tubular portion 11b agrees with a rotation direction Ra of the cutting blade 14. In other words, the grass discharge passage 21 extends tangentially to the rotating path of the cutting blade 14. The passage opening 24 opens in the rotation direction Ra of the cutting blade 14.

The shutter 49 is a member in a fan-like shape when viewed from the top (bottom) with the shaft center SC as its rotation center, and opens in the rotation direction Ra of the cutting blade 14. When the fan-shaped shutter 49 is opened at a certain angle, the amount of displacement of the outer periphery of the shutter 49b is greater than the amount of displacement of the inner periphery as will be understood. With the shutter 49 opened at a certain angle, a greatly-displaced outer peripheral portion of the shutter 49 can relatively largely open the passage opening 24.

The swirling velocity of grass clippings swirling within the housing 11 by the rotation of the cutting blade 14 is higher as being farther from the shaft center SC.

As is apparent from the above, when the passage opening 24 of the grass discharge passage 21 extending tangentially to the outer tubular portion 11b is opened to some degree (more than 0% and less than 100% opening) with the shutter 49 in the intermediate mode, grass clippings swirling at a higher velocity through a peripheral region within the housing 11 easily flow from the passage opening 24 into the grass discharge passage 21. This results in an increased efficiency in the reception of grass clippings in the intermediate mode.

In the present invention, the power source is not limited to the engine 11 and may be an electric motor, for example.

The grass receptacle 23 is not limited to a grass bag and may be a box, for example.

The shutter 49 may have any shape, size and material as long as being configured to be able to control the degree of opening of the passage opening 24.

The guide 70 may have any shape, size and material.

The rear guide end 71 may have any shape and size of the depressions 71a and the projections 71b as long as being in a wave shape.

The present disclosure relates to the subject matter of Japanese Patent Application No.2002-087037, filed Mar. 26, 2002, the disclosure of which is expressly incorporated herein by reference in its entirety.

What is claimed is:

1. A lawn mower, comprising:

a power source with an output shaft extending downwardly;

a housing provided below said power source, opening downward;

a cutting blade housed in said housing and attached to said output shaft;

a grass discharge passage extending rearward from said housing;

a grass receptacle removably mounted to a receptacle mounted portion provided at said grass discharge passage, for receiving grass cut by said cutting blade through said grass discharge passage; and a shutter provided at a passage opening of said grass discharge passage facing said housing; wherein, said shutter is configured to be rotatable about the axis of said output shaft so as to adjust the degree of opening of said passage opening.

2. A lawn mower as set forth in claim 1, wherein:

said housing has a scroll portion for allowing grass cut by said cutting blade to swirl within said housing while guiding it to said grass discharge passage;

a guide is provided along said scroll portion beneath a top plate of said housing;

a rear guide end of said guide is opposed to said passage opening; and said rear guide end is placed higher in level than the bottom of said passage opening.

3. A lawn mower as set forth in claim 2, wherein said rear guide end of said guide is formed in a wave shape.

* * * * *